United States Patent
Masada et al.

(10) Patent No.: US 9,708,506 B2
(45) Date of Patent: Jul. 18, 2017

(54) INK, INK CARTRIDGE, AND IMAGE RECORDING METHOD

(71) Applicant: CANON KABUSHIKI KAISHA, Tokyo (JP)

(72) Inventors: Yohei Masada, Tokyo (JP); Masahiro Terada, Hadano (JP); Hidetaka Kawamura, Yokohama (JP); Akihiro Taya, Yokohama (JP); Masanobu Ootsuka, Tokyo (JP); Takaharu Aotani, Tokyo (JP); Yutaka Yoshimasa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/133,719

(22) Filed: Apr. 20, 2016

(65) Prior Publication Data

US 2016/0319154 A1 Nov. 3, 2016

(30) Foreign Application Priority Data

Apr. 28, 2015 (JP) ................. 2015-092342

(51) Int. Cl.
| | |
|---|---|
| C09D 11/02 | (2014.01) |
| C09D 175/08 | (2006.01) |
| C09D 11/00 | (2014.01) |
| C09D 11/322 | (2014.01) |
| C09D 11/38 | (2014.01) |
| B41J 2/175 | (2006.01) |

(52) U.S. Cl.
CPC ............ *C09D 175/08* (2013.01); *C09D 11/00* (2013.01); *C09D 11/02* (2013.01); *C09D 11/322* (2013.01); *C09D 11/38* (2013.01); *B41J 2/17503* (2013.01)

(58) Field of Classification Search
CPC .... C09D 175/08; C09D 11/322; C09D 11/38; C09D 11/02; C09D 11/00; B41J 2/17503
See application file for complete search history.

(56) References Cited

U.S. PATENT DOCUMENTS

| | | | |
|---|---|---|---|
| 2010/0214352 A1 | 8/2010 | Tsunoda | |
| 2010/0227067 A1* | 9/2010 | Namba | ................. B41M 5/502 427/288 |
| 2012/0268536 A1* | 10/2012 | Saito | .................... C09D 11/322 347/96 |

FOREIGN PATENT DOCUMENTS

| | | |
|---|---|---|
| EP | 2862906 A1 | 4/2015 |
| JP | 2012-096369 A | 5/2012 |

(Continued)

*Primary Examiner* — Manish S Shah
*Assistant Examiner* — Yaovi M Ameh
(74) *Attorney, Agent, or Firm* — Canon U.S.A., Inc., IP Division

(57) ABSTRACT

An ink containing a self-dispersing pigment, polyurethane resin particles, a surfactant, and water, wherein the self-dispersing pigment is a pigment having a phosphonate group bonded directly or via another atomic group to the surface of the pigment, wherein the polyurethane resin particles have an anionic functional group content of 0.1 mmol/g or more and 0.4 mmol/g or less on the surfaces of the polyurethane resin particles and have a volume average particle size of 10.0 nm or more and 50.0 nm or less, and the surfactant includes a surfactant represented by a general formula (1), wherein the amount of the surfactant represented by the general formula (1) is 0.05 times or more and 1.00 times or less the amount of the polyurethane resin particles.

13 Claims, 1 Drawing Sheet

(56) References Cited

FOREIGN PATENT DOCUMENTS

| JP | 2013-253236 | * 12/2013 | ............. C09D 11/00 |
| JP | 2013-253236 A | 12/2013 | |

* cited by examiner

INK, INK CARTRIDGE, AND IMAGE RECORDING METHOD

BACKGROUND

Field of the Disclosure

The present disclosure relates to an ink, an ink cartridge, and an image recording method.

Description of the Related Art

In image recording methods, inks containing self-dispersing pigments as coloring materials have been conventionally used for the purpose of improving the optical density of images. In particular, self-dispersing pigments having a phosphonate group bonded directly or via another atomic group to the surfaces of the self-dispersing pigments (hereinafter also referred to simply as "phosphonate-type self-dispersing pigments") are known to easily provide images having high color development.

However, inks containing self-dispersing pigments disadvantageously provide images with low scratch resistance although such inks provide images with relatively high color development. Therefore, an attempt to improve the scratch resistance of images has been made by further adding polyurethane resin particles to an ink containing a self-dispersing pigment (Japanese Patent Laid-Open No. 2013-253236). In Japanese Patent Laid-Open No. 2013-253236, an ink containing a phosphonate-type self-dispersing pigment and polyurethane resin particles is described.

SUMMARY

According to an aspect of the present disclosure, an ink contains a self-dispersing pigment, polyurethane resin particles, a surfactant, and water. The self-dispersing pigment is a pigment having a phosphonate group bonded directly or via another atomic group to the surface of the pigment. The polyurethane resin particles have an anionic functional group content of 0.1 mmol/g or more and 0.4 mmol/g or less on the surfaces and have a volume average particle size of 10.0 nm or more and 50.0 nm or less. The surfactant includes a surfactant represented by a general formula (1) below:

General Formula (1)

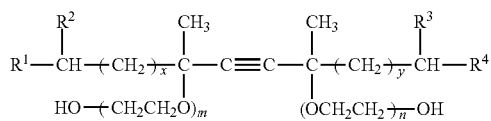

In the general formula (1), $R^1$ to $R^4$ are each independently an alkyl group having 1 to 3 carbon atoms, x and y are each independently 2 to 5, and m+n is 0 to 10.

The mass ratio of the amount of the surfactant represented by the general formula (1) to the amount of the polyurethane resin particles is 0.05 or more and 1.00 or less.

According to another aspect of the present disclosure, an ink cartridge includes an ink storage unit that contains an ink. The ink contained in the ink storage unit is the ink described above.

According to another aspect of the present disclosure, an image recording method includes an ink applying step of applying an ink to a recording medium. This ink is the ink described above.

According to the present disclosure, an ink that can impart both high color development and high scratch resistance to images can be provided. According to the present disclosure, an ink cartridge containing the ink and an image recording method using the ink can be provided.

Further features of the present disclosure will become apparent from the following description of exemplary embodiments with reference to the attached drawings.

DESCRIPTION OF THE EMBODIMENTS

Figure 1:
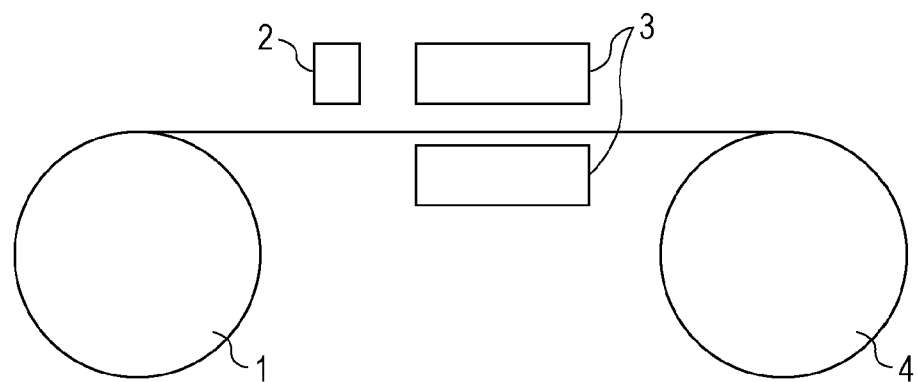
FIG. 1 is a schematic diagram showing an example image recording apparatus used in accordance with one or more embodiments of an image recording method of the present disclosure.

According to studies by the inventors, the ink described in Japanese Patent Laid-Open No. 2013-253236 provides images with high scratch resistance but color development of images formed with the ink does not reach a level acceptable to the present disclosure.

Therefore, the present disclosure provides an ink that can impart both high color development and high scratch resistance to images. The present disclosure also provides an ink cartridge containing the ink of the present disclosure and an image recording method using the ink of the present disclosure.

The present disclosure will be described below in detail by way of some embodiments.

The inventors first examined the reason why color development of images formed with the ink described in Japanese Patent Laid-Open No. 2013-253236 does not reach a level acceptable to the present disclosure as mentioned above. As a result, it was found that the reason for this is that the surface of a recording medium is hydrophilized by a surfactant contained in the ink and thus the ink applied to the recording medium tends to permeate into the recording medium. Specifically, the "hydrophilization of the surface of the recording medium" is probably caused by the orientation of the surfactant molecules such that the hydrophobic site faces the surface side of the recording medium having relatively high hydrophobicity, that is, the hydrophilic site faces the atmosphere side.

The inventors have studied an ink composition that is less likely to cause hydrophilization of the surface of a recording medium and, as a result, have developed the composition of the present disclosure. That is, the inventors have found that both high color development and high scratch resistance of images can be achieved with an ink containing a phosphonate-type self-dispersing pigment, polyurethane resin particles, and a surfactant. The polyurethane resin particles have a particular anionic functional group content (0.1 mmol/g or more and 0.4 mmol/g or less) on the surfaces and a particular volume average particle size (10.0 nm or more and 50.0 nm or less). The surfactant is represented by a general formula (1) below and is added to the ink at a particular mass ratio to the polyurethane resin particles.

General Formula (1)

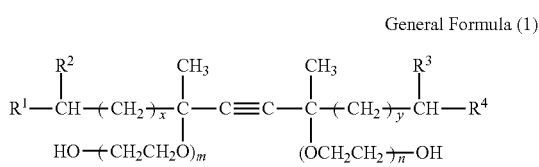

In the general formula (1), $R^1$ to $R^4$ are each independently an alkyl group having 1 to 3 carbon atoms, x and y are each independently 2 to 5, and m+n is 0 to 10. The mechanism by which advantageous effects of the present disclosure are obtained by this composition is considered as follows.

The hydrophilization of the surface of a recording medium may be affected by not only the type of surfactant but also the type of polyurethane resin particles that can adsorb the surfactant on their surfaces. The inventors have studied various combinations of surfactants and polyurethane resin particles. As a result, it has been found that, when a particular surfactant and particular polyurethane resin particles as defined in the present disclosure are combined and further used at a particular mass ratio, the surfactant molecules are unlikely to have the above-described orientation on the surface of a recording medium, and thus the surface of the recording medium is less likely to undergo hydrophilization. Consequently, the ink applied to the recording medium does not permeate into the recording medium and the pigment stays near the surface of the recording medium. This probably results in images obtained having improved color development.

In this manner, advantageous effects of the present disclosure, namely, both high color development and high scratch resistance of images, can be achieved by a synergistic effect of the components.

Ink

An ink of the present disclosure may be an ink for use in an inkjet image recording method, that is, an ink for inkjet printing. Hereinafter, components contained in the ink of the present disclosure will be described.

Self-Dispersing Pigment Having Phosphonate Group Bonded Directly or Via Another Atomic Group to Surface The ink of the present disclosure contains a self-dispersing pigment having a phosphonate group bonded directly or via another atomic group to the surface of the self-dispersing pigment. The phosphonate groups in the ink may be either partially dissociated or entirely dissociated.

The amount (mass %) of the self-dispersing pigment having a phosphonate group bonded directly or via another atomic group to the surface of the self-dispersing pigment in the ink is preferably 0.1 mass % or more and 15.0 mass % or less, more preferably 0.1 mass % or more and 8.0 mass % or less, and still more preferably 3.0 mass % or more and 6.0 mass % or less, based on the total mass of the ink. When the amount of the self-dispersing pigment is less than 1.0 mass %, sufficient color development may not be obtained. When the amount of the self-dispersing pigment is more than 10.0 mass %, sufficient ink ejection stability may not be obtained.

In the present disclosure, the self-dispersing pigment may have an average particle size of 50 nm or more and 200 nm or less.

Phosphonate Group

In the present disclosure, the phosphonate group is bonded directly to the surfaces of the pigment particles or via another atomic group (—R—) to the surfaces of the pigment particles. Examples of the phosphonate group include a $PO_3HM$ group and a $PO_3M_2$ group. In these formulas, M is a hydrogen atom, an alkali metal, ammonium, or an organic ammonium. The phosphonate group may have a structure of —$CQ(PO_3M_2)_2$. In this formula, Q is a hydrogen atom, R', OR', SR', or NR'$_2$, and R' is each independently a hydrogen atom, an alkyl group, an acyl group, an aralkyl group, or an aryl group. Specifically, examples of the alkyl group include a methyl group and an ethyl group; examples of the acyl group include an acetyl group and a benzoyl group; examples of the aralkyl group include a benzyl group; and examples of the aryl group include a phenyl group and a naphthyl group. In the present disclosure, the phosphonate group may have a structure of —$CH(PO_3M_2)_2$, namely, —$CQ(PO_3M_2)_2$ where Q is a hydrogen atom. Examples of another atomic group (—R—) include an amide group, an amino group, a ketone group, an ester group, an ether group, alkylene groups having 1 to 12 carbon atoms, substituted and unsubstituted phenylene groups, and substituted and unsubstituted naphthylene groups. In the present disclosure, —R— may include —$C_6H_4$—CONH— (benzamide structure) or —$C_6H_4$—$SO_2NH$— (benzenesulfonamide structure). In the present disclosure, plural phosphonate groups may be bonded to the carbon atom(s) of the atomic group (—R—). Specific examples include self-dispersing pigments having, on the surfaces, an atomic group having a bisphosphonate group and a triphosphonate group. The self-dispersing pigment may have an atomic group having a bisphosphonate group from the standpoint of both image fastness and pigment dispersion stability during long-term storage.

Type of Pigment

Examples of the pigment that can be used in the ink of the present disclosure include inorganic pigments, such as carbon black, and organic pigments. Any publicly known pigment usable for inks can be used in the ink.

Any carbon black that has been commonly used in the related art can be used as a carbon black for use in the ink of the present disclosure. Specific examples of the carbon black include furnace black, acetylene black, channel black, thermal black, and lamp black. More specifically, commercially available carbon blacks listed below can be used. Examples include Raven 7000, 5750, 5250, 5000 Ultra, 3500, 2000, 1500, 1255, 1250, 1200, 1190 Ultra-II, and 1170 (available from Columbian Chemicals Co.); MONARCH 700, 800, 880, 900, 1000, 1100, 1300, 1400, and 2000 (available from Cabot Corporation); BLACK PEARLS 880, 800, and L (available from Cabot Corporation); Color black FW1, FW2, FW2V, FW18, FW200, S150, S160, and S170 (available from Degussa AG); Printex 85, 95, 140U, 140V, U, and V (available from Degussa AG); Special Black 6, 5, 4A, and 4 (available from Degussa AG); and No. 900, No. 1000, No. 2200B, No. 2300, No. 2350, No. 2400R, and MCF-88 (available from Mitsubishi Chemical Corporation). Of course, a carbon black freshly prepared for the present disclosure can also be used. Examples of phosphonate-type self-dispersing carbon blacks include CAB-O-JET 400 (available from Cabot Corporation).

Organic pigments that can be used in the ink for use in the present disclosure are as follows. Copper phthalocyanine pigments may be used as a cyan pigment. Specific examples of copper phthalocyanine pigments include C. I. Pigment Blue 1, 2, 3, 15, 15:2, 15:3, 15:4, 16, 22, and 60. Examples of phosphonate-type self-dispersing cyan pigments include CAB-O-JET 450C (available from Cabot Corporation). Quinacridone pigments may be used as a magenta pigment. Specific examples of quinacridone pigments include C. I.

Pigment Red 5, 7, 12, 48, 48:1, 57, 112, 122, 123, 146, 168, 184, 202 and 207; and C. I. Pigment Violet 19. Examples of phosphonate-type self-dispersing magenta pigments include CAB-O-JET 465M and CAB-O-JET 480V (available from Cabot Corporation). Azo pigments may be used as a yellow pigment. Specific examples of azo pigments include C. I. Pigment Yellow 12, 13, 14, 16, 17, 74, 83, 93, 95, 97, 98, 114, 128, 129, 151, and 154. Examples of phosphonate-type self-dispersing yellow pigments include CAB-O-JET 470Y (available from Cabot Corporation).

Pigment Analysis Method

In the present disclosure, a method for determining whether a pigment contained in the ink is a self-dispersing pigment is as follows. Specifically, the ink is allowed to form a precipitate by addition of an acid and the precipitate is then collected by centrifugation. In the case of a pigment dispersion, the pigment dispersion is allowed to form a precipitate by addition of an acid and the precipitate is then collected. The collected precipitate is placed on a petri dish, and water is added, followed by stirring for re-dispersion. If no precipitate is formed and a pigment is dispersed in the petri dish after standing for one day, the pigment is determined to be a self-dispersing-type pigment.

When the pigment contained in the ink is a self-dispersing pigment, the presence of the phosphonate group can be investigated with an ICP emission spectrometer. Specifically, if a phosphorus element is detected with the ICP emission spectrometer, the pigment is determined to have a phosphonate group.

Polyurethane Resin Particles

In the present disclosure, polyurethane resin particles need to have a volume average particle size of 10.0 nm or more and 50.0 nm or less. The volume average particle size is more preferably 15.0 nm or more and 30.0 nm or less. The volume average particle size of the resin particles in the present disclosure can be obtained by the following method. Specifically, a dispersion of the resin particles is diluted 100- to 1,000-fold (on a volume basis) with pure water, and the volume average particle size is measured by using UPA-EX150 (available from Nikkiso Co., Ltd.) under the following conditions: SetZero: 30 s; number of measurements: 3; measurement time: 180 seconds; and refractive index: 1.5.

In the present disclosure, the anionic functional group content on the surfaces of the polyurethane resin particles needs to be 0.1 mmol/g or more and 0.4 mmol/g or less. The anionic functional group content on the surfaces of the polyurethane resin particles can be obtained by subjecting an aqueous dispersion of the polyurethane resin particles to colloidal titration. In Examples described below, the anionic functional group content on the surfaces of the polyurethane resin particles in the dispersion of the polyurethane resin particles was determined by colloidal titration using a potential difference with an automatic potentiometric titrator (AT-510; available from Kyoto Electronics Manufacturing Co., Ltd.) equipped with a stream potential titration unit (PCD-500). In this case, methyl glycol chitosan was used as a titrant. In order to determine the anionic functional group content on the surfaces of the polyurethane resin particles contained in the ink, the pigment and the polyurethane resin particles can be first separated from each other. The ink is centrifuged at 440,000 G at 23° C. for 2 hours, a supernatant containing the polyurethane resin particles is collected, and the anionic functional group content on the surfaces of the polyurethane resin particles can be determined by the above measurement method. Examples of the anionic functional group of the polyurethane resin particles in the present disclosure include —COOM, —SO$_3$M, —PO$_3$HM, and —PO$_3$M$_2$. In the formulas, "M" is a hydrogen atom, an alkali metal, ammonium, or an organic ammonium. The anionic functional group may be —COOM from the standpoint of dispersion stability. Furthermore, "M" may be triethanolamine, which is an organic ammonium.

The acid value of the polyurethane resin particles is preferably 100 mg KOH/g or less, and more preferably 30 mg KOH/g or more and 60 mg KOH/g or less. The acid value of the polyurethane resin particles can be determined by a titration method. For example, the resin particles are dissolved in THF, and the acid value is determined by potentiometric titration with a titrant, potassium hydroxide in ethanol, using an automatic potentiometric titrator, AT 510 (available from Kyoto Electronics Manufacturing Co., Ltd.).

The polystyrene-equivalent weight-average molecular weight (Mw) of the polyurethane resin particles used in the ink of the present disclosure, the weight-average molecular weight being obtained by gel permeation chromatography (GPC), is preferably 5,000 or more and 150,000 or less, and more preferably 8,000 or more and 100,000 or less. The weight-average molecular weight of the resin particles is measured by using a device, Alliance GPC 2695 (available from Waters Corporation), a series of four Shodex KF-806M columns (available from Showa Denko K.K.), and a refractive index (RI) detector, and is calculated by using PS-1 and PS-2 (available from Polymer Laboratories) as polystyrene standard samples.

In the present disclosure, the amount of the polyurethane resin particles is preferably 3.0 mass % or more and 15.0 mass % or less, and more preferably 5.0 mass % or more and 8.0 mass % or less, based on the total mass of the ink. When the amount of the polyurethane resin particles is less than 3.0 mass %, a sufficient effect of improving the scratch resistance of obtained images may not be obtained. When the amount of the polyurethane resin particles is more than 15.0 mass %, sufficient ink ejection stability may not be obtained.

Method for Producing Polyurethane Resin Particles

A method for producing polyurethane resin particles in the present disclosure can be any method that has been commonly used in the related art. Examples of the method include the following methods. A polyol having no acid group is dissolved in an organic solvent, such as methyl ethyl ketone, while stirring well. A polyisocyanate and a diol having an acid group are then added to the resultant solution to cause a reaction and, as a result, a urethane prepolymer solution is obtained. Next, the obtained urethane prepolymer solution is neutralized and ion-exchanged water is then added to the solution, followed by emulsification by high-speed stirring with a homomixer. After emulsification, a chain extension reaction is induced by addition of a chain extender.

Materials forming the polyurethane resin particles will be described below.

(1) Polyisocyanate

In the present disclosure, the polyurethane resin particles may have a unit derived from a polyisocyanate. The term "polyisocyanate" as used herein refers to a compound having two or more isocyanate groups. Specific examples of the polyisocyanate that can be used in the present disclosure include aliphatic polyisocyanates, alicyclic polyisocyanates, aromatic polyisocyanates, and aromatic aliphatic polyisocyanates. The mass percentage of the unit derived from the polyisocyanate to the polyurethane resin particles may be 10.0 mass % or more and 80.0 mass % or less.

Examples of the aliphatic polyisocyanates include tetramethylene diisocyanate, dodecamethylene diisocyanate, hexamethylene diisocyanate, 2,2,4-trimethylhexamethylene diisocyanate, 2,4,4-trimethylhexamethylene diisocyanate, lysine diisocyanate, 2-methylpentane-1,5-diisocyanate, and 3-methylpentane-1,5-diisocyanate. Examples of the alicyclic polyisocyanates include isophorone diisocyanate, hydrogenated xylylene diisocyanate, dicyclohexylmethane 4,4'-diisocyanate, 1,4-cyclohexane diisocyanate, methylcyclohexylene diisocyanate, and 1,3-bis(isocyanatemethyl)cyclohexane. Examples of the aromatic polyisocyanates include tolylene diisocyanate, 2,2'-diphenylmethane diisocyanate, 2,4'-diphenylmethane diisocyanate, 4,4'-diphenylmethane diisocyanate, 4,4'-dibenzyl diisocyanate, 1,5-naphthylene diisocyanate, xylylene diisocyanate, 1,3-phenylene diisocyanate, and 1,4-phenylene diisocyanate. Examples of the aromatic aliphatic polyisocyanates include dialkyldiphenylmethane diisocyanate, tetraalkyldiphenylmethane diisocyanate, and α,α,α,α-tetramethylxylylene diisocyanate. These polyisocyanates may be used alone or in combination of two or more as desired. In the present disclosure, at least one selected from isophorone diisocyanate, hexamethylene diisocyanate, and dicyclohexylmethane 4,4'-diisocyanate may be used among the polyisocyanates described above. Isophorone diisocyanate may be used.

(2) Polyol Having No Acid Group

In the present disclosure, the polyurethane resin particles may have a unit derived from a polyol having no acid group. The mass percentage of the unit derived from a polyol having no acid group to the polyurethane resin particles may be 0.1 mass % or more and 80.0 mass % or less.

Examples of the polyol having no acid group include polyester polyols, polyether polyols, and polycarbonate diols. The polyol having no acid group used in the present disclosure may have 13 or more carbon atoms and 250 or less carbon atoms. The polystyrene-equivalent number-average molecular weight of the polyol having no acid group, the number-average molecular weight being obtained by GPC, may be 600 or more and 4,000 or less.

Examples of the polyester polyols include esters formed by reaction between acid components and polyalkylene glycols, dihydric alcohols, or trihydric or other polyhydric alcohols. Examples of the acid components for forming polyester polyols include aromatic dicarboxylic acids, alicyclic dicarboxylic acids, and aliphatic dicarboxylic acids. Examples of the aromatic dicarboxylic acids include isophthalic acid, terephthalic acid, orthophthalic acid, 1,4-naphthalene dicarboxylic acid, 2,5-naphthalene dicarboxylic acid, 2,6-naphthalene dicarboxylic acid, biphenyldicarboxylic acid, and tetrahydrophthalic acid. Examples of the alicyclic dicarboxylic acids include hydrogenated products of the aromatic dicarboxylic acids described above. Examples of the aliphatic dicarboxylic acid include malonic acid, succinic acid, tartaric acid, oxalic acid, glutaric acid, adipic acid, pimelic acid, suberic acid, azelaic acid, sebacic acid, alkylsuccinic acid, linolenic acid, maleic acid, fumaric acid, mesaconic acid, citraconic acid, and itaconic acid. For example, reactive derivatives of these acid components, such as acid anhydrides, alkyl esters, and acid halides, can also be used as the acid components for forming polyester polyols. Furthermore, the above acid components for forming polyester polyols may be used alone or in combination of two or more as desired. Examples of the polyalkylene glycols include polyethylene glycol, polypropylene glycol, polytetramethylene glycol, and an ethylene glycol-propylene glycol copolymer. Examples of the dihydric alcohols include hexamethylene glycol, tetramethylene glycol, ethylene glycol, diethylene glycol, propylene glycol, dipropylene glycol, 1,3-butanediol, 1,4-butanediol, 4,4'-dihydroxyphenylpropane, and 4,4'-dihydroxyphenylmethane. Examples of the trihydric or other polyhydric alcohols include glycerol, trimethylolpropane, 1,2,5-hexanetriol, 1,2,6-hexanetriol, and pentaerythritol. These polyester polyols may be used alone or in combination of two or more as desired.

Examples of the polyether polyols include polyalkylene glycols and products obtained by addition polymerization of alkylene oxides and dihydric alcohols or trihydric or other polyhydric alcohols. Examples of the polyalkylene glycols include polyethylene glycol, polypropylene glycol, polytetramethylene glycol, and an ethylene glycol-propylene glycol copolymer. Examples of the dihydric alcohols include hexamethylene glycol, tetramethylene glycol, ethylene glycol, diethylene glycol, propylene glycol, dipropylene glycol, 1,3-butanediol, 1,4-butanediol, 4,4'-dihydroxyphenylpropane, and 4,4'-dihydroxyphenylmethane. Examples of the trihydric or other polyhydric alcohols include glycerol, trimethylolpropane, 1,2,5-hexanetriol, 1,2,6-hexanetriol, and pentaerythritol. Examples of the alkylene oxides include ethylene oxide, propylene oxide, butylene oxide, and α-olefin oxide. These polyether polyols may be used alone or in combination of two or more as desired.

A polycarbonate diol produced by a method known in the related art can be used as the polycarbonate diol. Examples of the polycarbonate diol include polycarbonate diols obtained by reaction between aliphatic diol components and phosgene or carbonate components, such as alkylene carbonates, diaryl carbonates, and dialkyl carbonates. These polycarbonate diols may be used alone or in combination of two or more as desired.

In the present disclosure, polyether polyols may be used among the above polyols having no acid group. That is, the polyurethane resin particles may be polyether-based polyurethane resin particles having a unit derived from a polyether polyol. Use of a polyether polyol allows a resin film to have appropriate flexibility and thus tends to improve the scratch resistance of images. Furthermore, since polyether polyols have relatively high hydrophilicity, good ink ejection stability is obtained. Of polyether polyols, polytetramethylene ether glycol may be used.

(3) Diol Having Acid Group

In the present disclosure, the polyurethane resin particles may have a unit derived from a diol having an acid group. The term "diol having an acid group" as used herein refers to a diol having an acid group, such as a carboxyl group, a sulfonate group, or a phosphate group. The diol having an acid group may be present in the form of an alkali metal salt with Li, Na, K, or the like, or an organic amine salt with ammonia, dimethylamine, or the like. As the diol having an acid group, dimethylol propionic acid and dimethylol butanoic acid may be used. These may be used alone or in combination as desired. The mass percentage of the unit derived from the diol having an acid group to the polyurethane resin particles may be 5.0 mass % or more and 40.0 mass % or less.

(4) Chain Extender

In the present disclosure, a chain extender may be used when the polyurethane resin particles are produced. A chain extender is a compound reactive with a residual isocyanate group that fails to form a urethane bond in the polyisocyanate unit of a urethane prepolymer. Examples of the chain extender include trimethylolmelamine and derivatives thereof; dimethylolurea and derivatives thereof; dimethylolethylamine, diethanolmethylamine, dipropanolethylamine, dibutanolmethylamine; polyvalent amine compounds, such as ethylenediamine, propylenediamine, diethylenetriamine, hexylenediamine, triethylenetetramine, tetraethylenepentamine, isophoronediamine, xylylenediamine, diphenylmethanediamine, hydrogenated diphenylmethanediamine, and hydrazine; polyamide polyamine; and polyethylene polyimine. Examples of the chain extender also include ethylene glycol, propylene glycol, 1,3-propanediol, 1,3-butanediol, 1,4-butanediol, 1,5-pentanediol, 1,6-hexanediol, neopentyl glycol, diethylene glycol, triethylene glycol, tetraethylene glycol, dipropylene glycol, tripropylene glycol, polyethylene glycol, 3-methyl-1,5-pentanediol, 2-butyl-2-ethyl-1,3-propanediol, 1,4-cyclohexanediol, 1,4-cyclohexanedimethanol, hydrogenated bisphenol A, glycerol, trimethylolpropane, and pentaerythritol. These chain extenders may be used alone or in combination of two or more as desired.

Surfactant

The ink of the present disclosure contains a surfactant represented by a general formula (1) below.

General Formula (1)

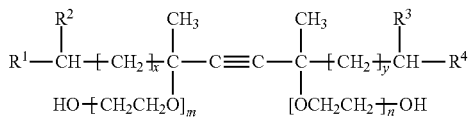

In the general formula (1), $R^1$ to $R^4$ are each independently an alkyl group having 1 to 3 carbon atoms. $R^1$ to $R^4$ may be methyl groups. In addition, x and y are each independently 2 to 5. Both x and y may be 2; m and n may be each independently 0 to 7; m+n is 0 to 10; and m+n may be 2 to 3.

Examples of the surfactant represented by the general formula (1) include Dynol 604, 607, 800, and 810 (available from Air Products and Chemicals, Inc.). ACETYLENOL E100 (available from Kawaken Fine Chemicals Co., Ltd.) which is commonly used is not included in the surfactant represented by the general formula (1) (both x and y in the general formula (1) are 1 for ACETYLENOL E100).

The amount of the surfactant represented by the general formula (1) is preferably 0.5 mass % or more and 3.0 mass % or less, and more preferably 0.7 mass % or more and 1.5 mass % or less, based on the total mass of the ink. When the amount of the surfactant is less than 0.5 mass %, sufficient ink ejection stability may not be obtained. When the amount of the surfactant is more than 3.0 mass %, a sufficient effect of improving color development of images may not be obtained.

The mass ratio of the amount of the surfactant represented by the general formula (1) to the amount of the polyurethane resin particles described above needs to be 0.05 or more and 1.00 or less. Furthermore, the mass ratio is preferably 0.10 or more and 0.50 or less, and more preferably 0.10 or more and 0.25 or less.

In the present disclosure, the ink may further contain a surfactant different from the surfactant represented by the general formula (1). For example, the ink may further contain a nonionic surfactant, such as acetyleneglycol and an adduct of acetyleneglycol with ethylene oxide, or other surfactants. In this case, the amount of the surfactant other than the surfactant represented by the general formula (1) may be 0.1 mass % or less, based on the total mass of the ink.

Water and Water-Soluble Organic Solvent

The ink of the present disclosure contains water and a water-soluble organic solvent. Deionized water (ion-exchanged water) may be used as water. The amount of water in the ink may be 50 mass % or more and 90 mass % or less, based on the total mass of the ink. The term "water-soluble organic solvent" as used herein refers to an "organic solvent having a water solubility of 500 g/l or more at 20° C." The water-soluble organic solvent may be a publicly known one that can be used in inks. Examples of the water-soluble organic solvent include alcohols, glycols, alkylene glycols, polyethylene glycols, nitrogen-containing compounds, and sulfur-containing compounds. These water-soluble organic solvents may be used alone or in combination of two or more as desired. A polyethylene glycol and glycerol may be used in order to control the viscosity of the ink. The number-average molecular weight of the polyethylene glycol used is preferably 500 or more and 1,200 or less, and more preferably 1,000 (what is called "polyethylene glycol 1000"). When the polyethylene glycol and glycerol are used together, the mass ratio of the amount of the polyethylene glycol to the amount of glycerol may be 0.15 or more and 0.40 or less.

The amount of the water-soluble organic solvent in the ink is preferably 50 mass % or less, and more preferably 5 mass % or more and 45 mass % or less, based on the total mass of the ink.

Additive

The ink of the present disclosure may contain various additives, such as a surfactant other than those mentioned above, a pH adjuster, an anticorrosive, a preservative, an antimicrobial agent, an antioxidant, a reduction inhibitor, an evaporation accelerator, and a chelating agent as desired.

The pH adjuster to be used may be an amine compound having a buffer capacity and may be N-butyldiethanolamine.

Physical Properties of Ink

In the present disclosure, the pH of the ink may be 7.0 or more and 8.7 or less. In particular, when triethanolamine is used as a counterion ("M" described above) for the anionic functional group of the polyurethane resin particles, the pH may be in the above range from the standpoint of the stability of the polyurethane resin particles. Specifically, when triethanolamine is used as a counterion for the anionic functional group, and the pH of the ink is more than 8.7, triethanolamine is easily separated from the anionic functional group and the ink tends to volatilize.

In the present disclosure, the surface tension of the ink is preferably 40 mN/m or less, and more preferably 35 mN/m or less. When what is called a "permeable ink" having a surface tension in this range is used in the present disclosure, a notable effect of improving color development may be obtained.

In the present disclosure, the degree of conductivity change $\Delta\sigma$ of the ink may be low. Specifically, the degree of conductivity change $\Delta\sigma$ of the ink may be 0.05 or less. The term "degree of conductivity change of the ink" as used herein refers to a value calculated in accordance with $\Delta\sigma = |\sigma_1 - \sigma_2|/\sigma_1$, where $\sigma_1$ represents a conductivity (μS/cm) of the ink immediately after preparation and $\sigma_2$ represents a conductivity (μS/cm) of the ink after 12-day storage in an environment at 60° C. after ink preparation. In order to decrease the degree of conductivity change of the ink, a salt may be added to the ink. The salt may be a publicly known one, preferably an alkali metal salt, and more preferably a potassium salt among alkali metal salts.

Ink Cartridge

An ink cartridge of the present disclosure includes an ink storage unit for containing an ink. The ink storage unit contains the ink of the present disclosure described above. An example structure of the ink cartridge is a structure in which the ink storage unit includes an ink container that contains a liquid ink and a negative-pressure-generating-member container that contains a negative-pressure-generating member internally holding the ink by negative pressure. Alternatively, the ink cartridge may include an ink storage unit in which a negative-pressure-generating member holds the total amount of the ink contained, instead of including an ink container that contains a liquid ink. Furthermore, the ink cartridge may have the ink storage unit and a recording head.

Image Recording Method

An image recording method of the present disclosure includes an ink applying step of applying the above ink to a recording medium. The image recording method may further include a conveying step of conveying the recording medium and a heating step of heating the recording medium to which the ink has been applied.

FIG. 1 is a schematic diagram showing an example image recording apparatus used in the image recording method of the present disclosure. In the image recording apparatus shown in FIG. 1, recording is performed by using a rolled recording medium and the recording medium is rolled up again. The image recording apparatus includes a recording-medium feeding unit 1 which is a unit for holding a rolled recording medium and feeding the recording medium, an ink application unit 2 which is a unit for applying an ink to the recording medium, a heating unit 3 which is a unit for heating the recording medium, and a recording-medium collecting unit 4 which is a unit for rolling up the recording medium on which an image is recorded. The units described above each perform a corresponding process while the recording medium is conveyed by a conveying unit, which includes a roller pair, a belt, and the like, along the recording-medium conveyance path indicated by the solid line in the drawing. The recording medium that is rolled up by the recording-medium collecting unit 4 may be supplied to another device or the like and may be cut into a desired size or be subjected to a bookbinding process or another process.

In the present disclosure, the conveyance rate of the recording medium in the conveying step of conveying the recording medium is preferably 50 m/min or more. The conveyance rate is more preferably 100 m/min or more.

In the present disclosure, tension may be applied to the recording medium during conveyance. That is, the image recording apparatus may have a tension applying unit with which tension is applied. In a specific method, for example, a tension applying part with which tension is applied to a recording medium and a tension controlling part with which the tension of the recording medium is controlled are provided in the conveyance mechanism between the recording-medium feeding unit 1 and the recording-medium collecting unit 4 in FIG. 1. When tension is applied to the recording medium, swelling of fibers in the recording medium due to water in the ink is suppressed. Swelling of fibers in the recording medium increases the size of the spaces between the fibers and accordingly increases the permeation rate of the ink. However, when the permeation rate of the ink increases, the ink tends to permeate deeply into the recording medium in a direction perpendicular to the surface of the recording medium and thus a sufficient optical density of an image may not be obtained. As described above, application of tension to the recording medium suppresses swelling of fibers in the recording medium due to water in the ink and thus can inhibit a decrease in the optical density of an image due to increased permeation rate of the ink.

The tension applied to the recording medium may be 20 N/m or more. When the tension is 20 N/m or more, swelling of fibers in the recording medium due to water in the ink is suppressed more efficiently. Furthermore, the tension applied to the recording medium is more preferably 30 N/m or more, and still more preferably 40 N/m or more and 100 N/m or less.

The ink applying step and the heating step will be described below.

(1) Ink Applying Step

In the present disclosure, the ink is applied to the recording medium in the ink applying step. An inkjet process can be employed as a process for applying the ink to the recording medium. That is, the image recording method of the present disclosure may be an inkjet recording method. The inkjet process may be what is called a thermal inkjet process, which involves ejecting the ink from an ejection port of a recording head by applying thermal energy to the ink, or may be what is called a piezoelectric inkjet process, which involves ejecting the ink from an ejection port of a recording head by using a piezoelectric element. For the ink of the present disclosure, a piezoelectric-inkjet-type image recording method may be used from the standpoint of the ejection stability of the ink containing the polyurethane resin particles.

The recording head may be what is called a serial-type recording head, which is moved in a direction crossing the conveyance direction of the recording medium during recording, or may be what is called a full-line-type recording head, in which plural nozzles are arranged so as to cover the expected maximum range of the recording medium. The recording head may be a full-line-type inkjet recording head in order to record an image at a high speed. The full-line-type inkjet recording head may include a nozzle array disposed in a direction perpendicular to the conveyance direction of the recording medium. Plural full-line-type inkjet recording heads may be disposed for respective ink colors and sequentially arranged in parallel to each other in the conveyance direction.

(2) Heating Step

In the present disclosure, the recording medium to which the ink has been applied may be heated in the heating step such that the surface temperature of the recording medium increases to 70° C. or more. The term "surface temperature of the recording medium to which the ink has been applied" as used herein refers to the temperature of a surface of the recording medium located at a position the recording medium reaches 0.5 seconds after the ink has been applied to the recording medium at 0 seconds. Specifically, the temperature of the surface of a recording region X in the recording medium is measured, the recording region X being located at a distance of "V×0.5/60 (m)" from the position of the ink applied in the recording medium (a position directly under the recording head for a full-line-type inkjet recording head) in the conveyance direction of the recording medium, given that V is the conveyance rate (m/min) of the recording medium. In Examples of the present disclosure, the temperature of the surface of a recording medium was measured at a distance of 10 cm in a direction substantially perpendicular to the surface of the recording medium by using a non-contact infrared thermometer, a digital infrared temperature sensor FT-H20 (available from KEYENCE CORPORATION).

In the present disclosure, the surface temperature of the recording medium to which the ink has been applied may be 80° C. or more. The surface temperature may be 140° C. or less in order to inhibit thermal deformation of the recording medium. An example method for heating the recording medium is a method for heating the recording medium from the front surface side (the side to which the ink has been applied) and/or the back surface side with a heater.

In the present disclosure, the recording medium may be continuously heated in the heating step before, during, and after application of the ink to the recording medium. In the present disclosure, before application of the ink to the recording medium, the recording medium may be unheated, or even if the recording medium is heated, the surface temperature of the recording medium is preferably less than 70° C., more preferably 60° C. or less, and still more preferably 40° C. or less.

In the heating step, the recording medium may be pressed with, for example, a pressure roller during heating of the recording medium. The fixability of an image can be improved by pressing the recording medium. In pressing the recording medium, the recording medium is not necessarily pressed throughout the heating step and may be pressed in part of the heating step. The recording medium may be subjected to multistage pressing. The pressing step may be performed after the heating step.

Recording Medium

In the image recording method of the present disclosure, any recording medium that has been commonly used in the related art can be used as a recording medium to which the ink is to be applied. A recording medium having a water absorption coefficient Ka of 0.1 $mL/m^2 \cdot ms^{1/2}$ or more is preferably used, a recording medium having a water absorption coefficient Ka of 0.2 $mL/m^2 \cdot ms^{1/2}$ or more is more preferably used, and a recording medium having a water absorption coefficient Ka of 0.3 $mL/m^2 \cdot ms^{1/2}$ or more is still more preferably used.

Figure 2:
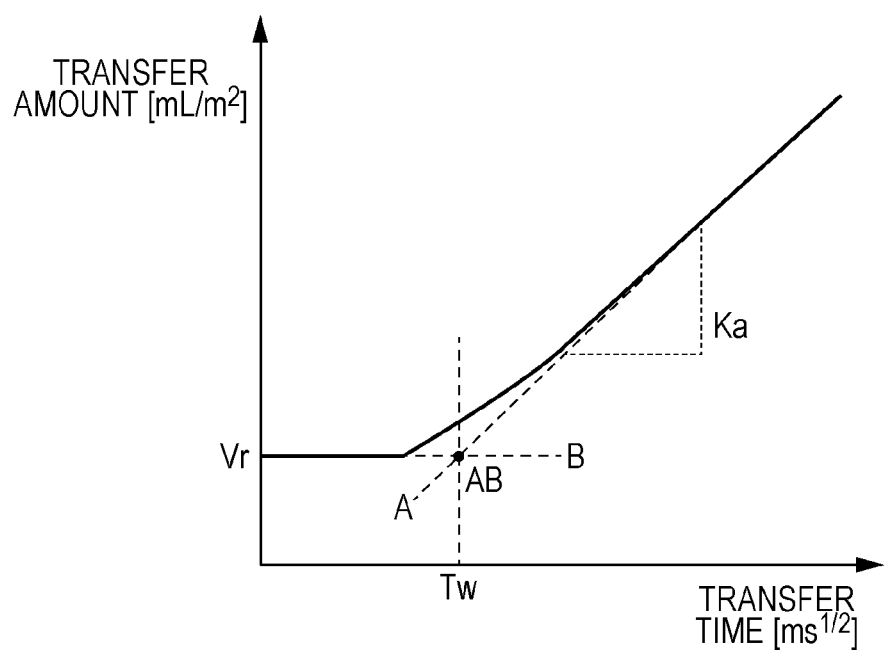
FIG. 2 is a graph showing an example absorption curve for describing the absorption coefficient Ka of a recording medium, in accordance with one or more embodiments of the present disclosure.

In the present disclosure, the Bristow's method described in "Liquid absorption testing method for paper and paperboard" in JAPAN TAPPI paper pulp testing method No. 51 is used as a method for calculating the absorption coefficient Ka of the recording medium. The Bristow's method is described in many commercially available books and thus will not be described in detail. The Bristow's method uses the wetting time Tw, the absorption coefficient Ka (mL/$m^2 \cdot ms^{1/2}$), and the roughness index Vr (mL/$m^2$). FIG. 2 shows an example absorption curve. The absorption curve shown in FIG. 2 is based on a permeation model in which a liquid starts to permeate into a recording medium at the wetting time Tw after the contact of the liquid with the recording medium. The slope of the straight line after the wetting time Tw is the absorption coefficient Ka. The absorption coefficient Ka corresponds to the permeation rate of the liquid into the recording medium. As shown in FIG. 2, the wetting time Tw is determined as the time until the intersection AB of an approximate straight line A and a straight line B. The approximate straight line A is based on the least-squares method for calculating the absorption coefficient Ka, and the straight line B is represented by V=Vr where V is a transfer amount of the liquid and Vr is a roughness index. In the present disclosure, water at 25° C. is used as a liquid to permeate into the recording medium. That is, Ka in the present disclosure denotes the absorption coefficient for water at 25° C.

The recording medium used in the inkjet recording method of the present disclosure may be a recording medium having a desired size obtained by performing precutting, or may be a rolled recording medium, which is to be cut into a desired size after formation of an image. As described above, a rolled recording medium may be used because tension is easily applied to the recording medium.

EXAMPLES

The present disclosure will be described below in more detail by way of Examples and Comparative Examples. The present disclosure is not restricted by Examples described below within the scope of the present disclosure. In the description of Examples below, the unit "part" is based on the mass unless otherwise specified.

Preparation of Ink

Each ink was prepared by mixing materials in amounts (unit: mass %) described in Table 1 below, stirring the mixture well to form a dispersion, and filtering the dispersion through a glass filter, AP20 (available from Millipore Corporation). The amounts (mass %) of the pigment and the resin particles in Table below are the solid contents (mass %) of the pigment and the polyurethane resin particles in the ink. Of the surfactants, Dynol 604, 607, and 800 (available from Air Products and Chemicals, Inc.) are surfactants represented by the general formula (1), and Emulgen 123P (available from Kao Corporation), which is polyoxyethylene lauryl ether, is a surfactant that is not represented by the general formula (1). The abbreviations in Table are as follows.

Self-dispersing pigment: a pigment having a phosphonate group bonded directly or via another atomic group to the surface of the pigment.

COJ 400: CAB-O-JET 400 (available from Cabot Corporation)
COJ 450C: CAB-O-JET 450C (available from Cabot Corporation)
COJ 465M: CAB-O-JET 465M (available from Cabot Corporation)
COJ 470Y: CAB-O-JET 470Y (available from Cabot Corporation)
Water-soluble organic solvent
Gly: Glycerol
PEG: Polyethylene glycol (number-average molecular weight: 1,000)
DEG: Diethylene glycol
Salt
$KHCO_3$: Potassium hydrogen carbonate
$Na_2SO_4$: Sodium sulfate
pH adjuster: N-butyldiethanolamine

TABLE 1

| | Preparation of Ink | | | | | | | | | | |
|---|---|---|---|---|---|---|---|---|---|---|---|
| | Self-dispersing pigment | | Surfactant | | Polyurethane-resin particles | | Water-soluble organic solvent | | | Salt | | pH adjuster |
| Ink no. | Type | Amount (mass %) | Type | Amount (mass %) | Type | Amount (mass %) | Gly (mass %) | PEG (mass %) | DEG (mass %) | $KHCO_3$ (mass %) | $Na_2SO_4$ (mass %) | (mass %) |
| Black Ink 1 | COJ 400 | 5 | Dynol 800 | 1.5 | PU-1 | 4 | 20 | 6 | 0 | 0.1 | 0 | 0.2 |
| Black Ink 2 | COJ 400 | 5 | Dynol 800 | 0.5 | PU-1 | 10 | 20 | 6 | 0 | 0.1 | 0 | 0.2 |
| Black Ink 3 | COJ 400 | 5 | Dynol 800 | 3 | PU-1 | 3 | 20 | 6 | 0 | 0.1 | 0 | 0.2 |
| Black Ink 4 | COJ 400 | 5 | Dynol 604 | 1.5 | PU-1 | 4 | 20 | 6 | 0 | 0.1 | 0 | 0.2 |

TABLE 1-continued

Preparation of Ink

| Ink no. | Self-dispersing pigment Type | Amount (mass %) | Surfactant Type | Amount (mass %) | Polyurethane-resin particles Type | Amount (mass %) | Water-soluble organic solvent Gly (mass %) | PEG (mass %) | DEG (mass %) | Salt KHCO$_3$ (mass %) | Na$_2$SO$_4$ (mass %) | pH adjuster (mass %) |
|---|---|---|---|---|---|---|---|---|---|---|---|---|
| Black Ink 5 | COJ 400 | 5 | Dynol 607 | 1.5 | PU-1 | 4 | 20 | 6 | 0 | 0.1 | 0 | 0.2 |
| Black Ink 6 | COJ 400 | 5 | Dynol 800 | 1.5 | PU-2 | 4 | 20 | 6 | 0 | 0.1 | 0 | 0.2 |
| Black Ink 7 | COJ 400 | 5 | Dynol 800 | 1.5 | PU-3 | 4 | 20 | 6 | 0 | 0.1 | 0 | 0.2 |
| Black Ink 8 | COJ 400 | 5 | Dynol 800 | 1.5 | PU-4 | 4 | 20 | 6 | 0 | 0.1 | 0 | 0.2 |
| Black Ink 9 | COJ 400 | 5 | Dynol 800 | 1.5 | PU-5 | 4 | 20 | 6 | 0 | 0.1 | 0 | 0.2 |
| Black Ink 10 | COJ 400 | 5 | Dynol 800 | 0.4 | PU-1 | 5 | 20 | 6 | 0 | 0.1 | 0 | 0.2 |
| Black Ink 11 | COJ 400 | 5 | Dynol 800 | 3.5 | PU-1 | 5 | 20 | 6 | 0 | 0.1 | 0 | 0.2 |
| Black Ink 12 | COJ 400 | 5 | Dynol 800 | 1.5 | PU-1 | 2.5 | 20 | 6 | 0 | 0.1 | 0 | 0.2 |
| Black Ink 13 | COJ 400 | 5 | Dynol 800 | 1.5 | PU-1 | 16 | 20 | 6 | 0 | 0.1 | 0 | 0.2 |
| Black Ink 14 | COJ 400 | 9 | Dynol 800 | 1.5 | PU-1 | 4 | 20 | 6 | 0 | 0.1 | 0 | 0.2 |
| Black Ink 15 | COJ 400 | 5 | Dynol 800 | 1.5 | PU-1 | 4 | 0 | 6 | 20 | 0.1 | 0 | 0.2 |
| Black Ink 16 | COJ 400 | 5 | Dynol 800 | 1.5 | PU-1 | 4 | 20 | 2 | 0 | 0.1 | 0 | 0.2 |
| Black Ink 17 | COJ 400 | 5 | Dynol 800 | 1.5 | PU-1 | 4 | 20 | 10 | 0 | 0.1 | 0 | 0.2 |
| Black Ink 18 | COJ 450C | 9 | Dynol 800 | 1.5 | PU-1 | 4 | 20 | 6 | 0 | 0.1 | 0 | 0 |
| Black Ink 19 | COJ 450C | 5 | Dynol 800 | 1.5 | PU-1 | 4 | 20 | 6 | 0 | 0 | 0 | 0.2 |
| Black Ink 20 | COJ 400 | 5 | Dynol 800 | 1.5 | PU-1 | 4 | 20 | 6 | 0 | 0 | 0.1 | 0.2 |
| Black Ink 21 | COJ 400 | 5 | Dynol 800 | 0.5 | PU-1 | 12 | 20 | 6 | 0 | 0.1 | 0 | 0.2 |
| Black Ink 22 | COJ 400 | 5 | Dynol 800 | 4 | PU-1 | 3 | 20 | 6 | 0 | 0.1 | 0 | 0.2 |
| Black Ink 23 | COJ 400 | 5 | Dynol 800 | 1.5 | PU-6 | 4 | 20 | 6 | 0 | 0.1 | 0 | 0.2 |
| Black Ink 24 | COJ 400 | 5 | Dynol 800 | 1.5 | PU-7 | 4 | 20 | 6 | 0 | 0.1 | 0 | 0.2 |
| Black Ink 25 | COJ 400 | 5 | Dynol 800 | 1.5 | PU-8 | 4 | 20 | 6 | 0 | 0.1 | 0 | 0.2 |
| Black Ink 26 | COJ 400 | 5 | Dynol 800 | 1.5 | PU-9 | 4 | 20 | 6 | 0 | 0.1 | 0 | 0.2 |
| Black Ink 27 | COJ 400 | 5 | Emulgen 123P | 1.5 | PU-1 | 4 | 20 | 6 | 0 | 0.1 | 0 | 0.2 |
| Cyan Ink 1 | COJ 450C | 5 | Dynol 800 | 1.5 | PU-1 | 4 | 20 | 6 | 0 | 0.1 | 0 | 0.2 |
| Cyan Ink 2 | COJ 450C | 5 | Dynol 800 | 0.5 | PU-1 | 10 | 20 | 6 | 0 | 0.1 | 0 | 0.2 |
| Cyan Ink 3 | COJ 450C | 5 | Dynol 800 | 3 | PU-1 | 3 | 20 | 6 | 0 | 0.1 | 0 | 0.2 |
| Cyan Ink 4 | COJ 450C | 5 | Dynol 604 | 1.5 | PU-1 | 4 | 20 | 6 | 0 | 0.1 | 0 | 0.2 |
| Cyan Ink 5 | COJ 450C | 5 | Dynol 607 | 1.5 | PU-1 | 4 | 20 | 6 | 0 | 0.1 | 0 | 0.2 |
| Cyan Ink 6 | COJ 450C | 5 | Dynol 800 | 1.5 | PU-2 | 4 | 20 | 6 | 0 | 0.1 | 0 | 0.2 |
| Cyan Ink 7 | COJ 450C | 5 | Dynol 800 | 1.5 | PU-3 | 4 | 20 | 6 | 0 | 0.1 | 0 | 0.2 |
| Cyan Ink 8 | COJ 450C | 5 | Dynol 800 | 1.5 | PU-4 | 4 | 20 | 6 | 0 | 0.1 | 0 | 0.2 |
| Cyan Ink 9 | COJ 450C | 5 | Dynol 800 | 1.5 | PU-5 | 4 | 20 | 6 | 0 | 0.1 | 0 | 0.2 |
| Magenta Ink 1 | COJ 465M | 5 | Dynol 800 | 1.5 | PU-1 | 4 | 20 | 6 | 0 | 0.1 | 0 | 0.2 |
| Yellow Ink 1 | COJ 470Y | 5 | Dynol 800 | 1.5 | PU-1 | 4 | 20 | 6 | 0 | 0.1 | 0 | 0.2 |

The polyurethane resin particles in Table 1 are detailed in Table 2 below. PU-1 and PU-2 are polyether-based polyurethane resin particles.

TABLE 2

Polyurethane-resin particles

| Polyurethane-resin particle No. | Product name | Manufacturer | Anionic functional group content on surface (mmol/g) | Volume average particle size (nm) |
|---|---|---|---|---|
| PU-1 | W-5661 | Mitsui Chemicals, Inc. | 0.39 | 22.0 |
| PU-2 | WLS-208 | DIC Corporation | 0.12 | 35.9 |
| PU-3 | SF 840 | DKS Co. Ltd. | 0.26 | 22.6 |
| PU-4 | HUX 522 | ADEKA Corporation | 0.26 | 15.2 |
| PU-5 | WEM-3008 | Taisei Fine Chemical Co., Ltd. | 0.16 | 49.7 |
| PU-6 | SF 300 | DKS Co. Ltd. | 0.03 | 87.1 |
| PU-7 | WBR 2101 | Taisei Fine Chemical Co., Ltd. | 0.53 | 23.5 |
| PU-8 | HUX 401 | ADEKA Corporation | 0.13 | 123.0 |
| PU-9 | SF830SH | DKS Co. Ltd. | 0.28 | 9.7 |

Preparation of Image Sample

An image sample was recorded on a recording medium by using the inkjet recording apparatus described in FIG. 1 including a piezoelectric inkjet head, KJ4 (available from KYOCERA Corporation; nozzle density: 600 dpi) and evaluated. The recording conditions are as follows: temperature: 25° C.; relative humidity: 55%; ink ejection frequency: 39 kHz; recording-medium conveyance rate: 100 m/s; and ink ejection volume during recording: about 13 pl per dot. For the inkjet recording apparatus, a duty for applying a dot of an ink droplet (13 ng) to a unit region of 1/600 inch×1/600 inch at a resolution of 600 dpi×600 dpi is defined as a 100% recording duty.

Evaluation

The following evaluation was carried out by using an inkjet recording apparatus (piezoelectric inkjet head KJ4 (available from KYOCERA Corporation; nozzle density: 600 dpi)) described in FIG. 1 including inks described in Table 3. The recording conditions are as follows: temperature: 25° C.; relative humidity: 55%; ink ejection frequency: 39 kHz; recording-medium conveyance rate: 100 m/s; and ink ejection volume during recording: about 13 pl per dot. For the inkjet recording apparatus, a duty for applying a dot of an ink droplet (13 ng) to a unit region of 1/600 inch×1/600 inch at a resolution of 600 dpi×600 dpi is defined as a 100% recording duty.

Color Development of Image

A solid image (100% recording duty) of 3 cm×3 cm was recorded on a recording medium, OK Prince High Quality (basis weight: 64 g/m$^2$) (available from Oji Paper Co., Ltd.) by using the inkjet recording apparatus. The optical density of the obtained image was determined with a reflection densitometer, RD19I (available from GretagMacbeth GmbH). The optical density of the image was evaluated based on the following evaluation criteria. In the present disclosure, A and B are taken as acceptable levels and C is taken as an unacceptable level in the following evaluation criteria. The evaluation results are shown in Table 3.

Black Ink, Cyan Ink

A: The optical density was 1.1 or more.
B: The optical density was 1.0 or more and less than 1.1.
C: The optical density was less than 1.0.

Magenta Ink, Yellow Ink

A: The optical density was 1.0 or more.
B: The optical density was 0.9 or more and less than 1.0.
C: The optical density was less than 0.9.

Scratch Resistance of Image

Three lines having a width of 3 mm and a line having a width of 17 mm (100% recording duty for all lines) were recorded on a recording medium, DL 9084 (basis weight: 91 g/m$^2$) (available from Mitsubishi Paper Mills Limited) by using the inkjet recording apparatus such that these lines were parallel to each other. Within 3 minutes after the image was recorded, OK Top Coat Plus (basis weight: 105 g/m$^2$) (available from Oji Paper Co., Ltd.) was placed on the image and a 500 g weight was further placed thereon such that the contact area was 12.6 cm$^2$. The recording medium on which the image was recorded and OK Top Coat Plus were rubbed against each other once at a relative velocity of 10 cm/s in scratch resistance testing. At this time, the contact surface of the weight was moved to across the recorded four lines at right angles. Subsequently, an ink attached in an area of 12.6 cm$^2$ of OK Top Coat Plus, the area being an area on which the weight was placed, was scanned with a scanner (multi-function device iR3245F (available from CANON KABUSHIKI KAISHA), 600 dpi, grayscale, photographic mode), and the area percentage of portions having a luminance of less than 128 in the 256 grayscale (ink attachment area percentage) was calculated. The scratch resistance of the image was evaluated based on the following evaluation criteria. In the present disclosure, A and B were taken as acceptable levels, and C was taken as an unacceptable level in the following evaluation criteria. The evaluation results are shown in Table 3.

A: The ink attachment area percentage was 1% or less.
B: The ink attachment area percentage was more than 1% and 5% or less.
C: The ink attachment area percentage was more than 5%.

Ink Ejection Stability

By using the inkjet recording apparatus, 10,000 solid images (100% recording duty) having a width of 10.5 cm in a direction perpendicular to the conveyance direction of the recording medium and having a length of 30 cm in the direction parallel to the conveyance direction were recorded on a recording medium, DL 9084 (basis weight: 91 g/m$^2$) (available from Mitsubishi Paper Mills Limited) at intervals of 15 cm in the conveyance direction. The first image and the 10,000th image were compared in terms of streaks and color unevenness by visual observation and evaluated for their ink ejection stability based on the following evaluation criteria. The evaluation results are shown in Table 3.

A: No difference between two images was observed.
B: A small difference between two images was observed.
C: A notable difference between two images was observed.

TABLE 3

Evaluation Results

| Example No. | Ink No. | Mass ratio: surfactant/polyurethane-resin particles | Color development of image | Scratch resistance of image | Ink ejection stability |
|---|---|---|---|---|---|
| Example 1 | Black Ink 1 | 0.38 | A | A | A |
| Example 2 | Black Ink 2 | 0.05 | A | A | A |
| Example 3 | Black Ink 3 | 1.00 | A | A | A |
| Example 4 | Black Ink 4 | 0.38 | A | A | A |
| Example 5 | Black Ink 5 | 0.38 | A | A | A |
| Example 6 | Black Ink 6 | 0.38 | A | A | A |
| Example 7 | Black Ink 7 | 0.38 | A | B | A |
| Example 8 | Black Ink 8 | 0.38 | A | B | A |
| Example 9 | Black Ink 9 | 0.38 | A | B | A |
| Example 10 | Cyan Ink 1 | 0.38 | A | A | A |
| Example 11 | Cyan Ink 2 | 0.05 | A | A | A |
| Example 12 | Cyan Ink 3 | 1.00 | A | A | A |
| Example 13 | Cyan Ink 4 | 0.38 | A | A | A |
| Example 14 | Cyan Ink 5 | 0.38 | A | A | A |
| Example 15 | Cyan Ink 6 | 0.38 | A | A | A |
| Example 16 | Cyan Ink 7 | 0.38 | A | B | A |
| Example 17 | Cyan Ink 8 | 0.38 | A | B | A |
| Example 18 | Cyan Ink 9 | 0.38 | A | B | A |
| Example 19 | Magenta Ink 1 | 0.38 | A | A | A |
| Example 20 | Yellow Ink 1 | 0.38 | A | A | A |
| Example 21 | Black Ink 10 | 0.08 | A | A | B |
| Example 22 | Black Ink 11 | 0.70 | B | A | A |
| Example 23 | Black Ink 12 | 0.60 | A | B | A |
| Example 24 | Black Ink 13 | 0.09 | A | A | B |
| Example 25 | Black Ink 14 | 0.38 | A | B | B |
| Example 26 | Black Ink 15 | 0.38 | B | A | A |
| Example 27 | Black Ink 16 | 0.38 | A | A | B |
| Example 28 | Black Ink 17 | 0.38 | A | A | B |
| Example 29 | Black Ink 18 | 0.38 | A | A | B |
| Example 30 | Black Ink 19 | 0.38 | B | A | A |
| Example 31 | Black Ink 20 | 0.38 | B | A | B |
| Comparative Example 1 | Black Ink 21 | 0.04 | A | A | C |
| Comparative Example 2 | Black Ink 22 | 1.33 | C | A | A |
| Comparative Example 3 | Black Ink 23 | 0.38 | A | B | C |
| Comparative Example 4 | Black Ink 24 | 0.38 | C | B | A |
| Comparative Example 5 | Black Ink 25 | 0.38 | A | B | C |
| Comparative Example 6 | Black Ink 26 | 0.38 | C | B | A |
| Comparative Example 7 | Black Ink 27 | 0.38 | C | B | A |

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-092342, filed Apr. 28, 2015, which is hereby incorporated by reference herein in its entirety.

What is claimed is:

1. An ink comprising a self-dispersing pigment, polyurethane resin particles, a surfactant, and water, wherein:
the self-dispersing pigment is a pigment having a phosphonate group bonded directly or via another atomic group to a surface of the pigment,
the polyurethane resin particles have an anionic functional group content of 0.1 mmol/g or more and 0.4 mmol/g or less on surfaces of the polyurethane resin particles and have a volume average particle size of 10.0 nm or more and 50.0 nm or less,
the surfactant includes a surfactant represented by a general formula (1) below,

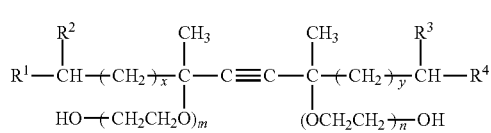

wherein, in the general formula (1), $R^1$ to $R^4$ are each independently an alkyl group having 1 to 3 carbon atoms, x and y are each independently 2 to 5, and m+n is 0 to 10, and
a mass ratio of an amount of the surfactant represented by the general formula (1) to an amount of the polyurethane resin particles is 0.05 or more and 1.00 or less.

2. The ink according to claim 1, wherein an amount (mass %) of the self-dispersing pigment is 0.1 mass % or more and 8.0 mass % or less, based on a total mass of the ink.

3. The ink according to claim 1, wherein the anionic functional group of the polyurethane resin particles is —COOM where M is a hydrogen atom, an alkali metal, ammonium, or an organic ammonium.

4. The ink according to claim 1, wherein an amount (mass %) of the polyurethane resin particles is 3.0 mass % or more and 15.0 mass % or less, based on a total mass of the ink.

5. The ink according to claim 1, wherein the polyurethane resin particles are polyether-based polyurethane resin particles.

6. The ink according to claim 1, wherein an amount (mass %) of the surfactant represented by the general formula (1) is 0.5 mass % or more and 3.0 mass % or less, based on a total mass of the ink.

7. The ink according to claim 1, further comprising polyethylene glycol and glycerol.

8. The ink according to claim 7, wherein a mass ratio of an amount of the polyethylene glycol to an amount of the glycerol in the ink is 0.15 or more and 0.40 or less.

9. The ink according to claim 1, having a pH of 7.0 or more and 8.7 or less.

10. The ink according to claim 1, having a degree of conductivity change $\Delta\sigma$ of 0.05 or less.

11. The ink according to claim 1, further comprising a potassium salt.

12. An ink cartridge comprising an ink storage unit that contains an ink, wherein the ink contained in the ink storage unit is the ink according to claim 1.

13. An image recording method comprising an ink applying step of applying an ink to a recording medium, wherein the ink is the ink according to claim 1.

* * * * *